United States Patent [19]

Van Iperen et al.

[11] Patent Number: 4,695,211

[45] Date of Patent: Sep. 22, 1987

[54] REFRIGERATED CARRIER FLOOR CLAMP

[75] Inventors: Willem H. P. Van Iperen, Westfield, N.J.; Henry J. Sandt, Jr., Mt. Bethel, Pa.; Eric G. Aronson, Livingston, N.J.

[73] Assignee: Sea-Land Corporation, Inc., Elizabeth, N.J.

[21] Appl. No.: 774,318

[22] Filed: Sep. 10, 1985

[51] Int. Cl.$^4$ .............................................. B60P 1/64
[52] U.S. Cl. ........................................ 410/77; 410/94; 248/503; 248/505
[58] Field of Search ................. 248/229, 231.6, 316.6, 248/500, 503, 505, 504, 503.1, 680, 499, 297.2, 297.3; 410/52, 77, 94–95, 104, 108, 115, 130, 129, 140; 411/84–85, 400, 90–100; 269/219, 221; 403/388, 390, 408.1; 224/326; 114/112, 204; 244/118.1

[56] References Cited

U.S. PATENT DOCUMENTS

| | | | |
|---|---|---|---|
| 427,479 | 5/1890 | McQuiston | 411/90 |
| 829,982 | 9/1906 | Lusher | 411/94 |
| 2,529,153 | 11/1950 | Hain . | |
| 2,597,670 | 1/1956 | MacDonald | 248/231.6 |
| 2,688,289 | 9/1954 | Sterling | 410/104 |
| 2,731,224 | 5/1952 | Pinto | 248/229 |
| 2,867,874 | 1/1959 | Larson . | |
| 2,891,490 | 6/1959 | Elsner . | |
| 3,836,106 | 9/1974 | Gray | 248/229 |
| 3,847,344 | 11/1974 | Kulczycki et al. . | |
| 4,120,076 | 10/1978 | Lebre . | |
| 4,121,789 | 10/1978 | Lent et al. . | |
| 4,230,432 | 10/1980 | Howell . | |
| 4,234,278 | 11/1980 | Harshman et al. . | |
| 4,311,420 | 1/1982 | Hendricks et al. . | |
| 4,323,182 | 4/1982 | Bott | 224/326 |
| 4,364,500 | 12/1982 | Bott | 224/326 |
| 4,431,123 | 2/1984 | Bott | 224/326 |
| 4,432,478 | 2/1984 | Bott | 224/326 |
| 4,449,875 | 5/1984 | Brunelle . | |
| 4,500,020 | 2/1985 | Rasor | 410/104 |

Primary Examiner—J. Franklin Foss
Assistant Examiner—Robert A. Olson
Attorney, Agent, or Firm—Scully, Scott, Murphy & Presser

[57] ABSTRACT

A cargo restraining floor clamp for use in refrigerated carriers having a T-type flooring structure to enable such carriers to be used for the transport of general types of cargo, thus minimizing the problem of dead-heading of these containers on a return trip. The floor clamp includes a channel shaped top floor plate positioned across the top of two adjacent T shaped floor members, and an under floor hold down plate positioned beneath the T tops between the two adjacent T shaped floor members. A pair of eye bolts extend through the top floor plate, between the two adjacent T shaped floor members, and through the under floor hold down plate, and serve to clamp the plates to opposite sides of the T tops of the T shaped floor members.

In a preferred embodiment a wooden beam is also positioned on top of the top floor plate, and a strap member is positioned on top of the wooden beam, with the two eye bolts extending through the strap member, outside the wooden beam, through the top floor plate, between the adjacent T shaped floor members, and into the threaded apertures of the under floor plate, to clamp all of those members together. Furthermore, the wooden beam extends transversely to the T shaped floor members, and the floor clamp is positioned near one end of the wooden beam, and a second similar floor clamp is positioned at the opposite, second end of the wooden beam.

10 Claims, 6 Drawing Figures

1

REFRIGERATED CARRIER FLOOR CLAMP

BACKGROUND OF THE INVENTION

1. Field of the Invention

The present invention relates generally to a cargo restraining clamp for use in refrigeration carriers, such as refrigerated containers or trailers, which does not permanently alter or modify the structure of the refrigerated carrier, and more paritularly the subject invention pertains to a cargo restraining floor clamp for refrigerated carriers having a T-type flooring structure.

Perishable commodities such as meat, vegetables, milk, plants, and also chemicals, are usually transported in refrigerated containers known as reefers, or refrigerated trailers or trucks, all or which are referred to herein as refrigerated carriers. The character of this type of cargo has dictated several criteria in the design of the transport carrier by which it is conveyed. Thus, to assure adequate ventilation to prevent localized spoilage and to improve the overall sanitary environment during transport, the floors of such carriers are usually T shaped or channeled to allow cool air to circulate freely beneath the cargo or the cartons or boxes in which the comestibles are contained. It is also desirable that the interior cargo space of the carriers afford minimum oppurtunity for dirt, grease or debris to accumulate and constitute a possible breeding environment for bacteria. Thus, stakewells or pockets or indentations, which might trap, or act as a repository for, these deleterious materials, are reduced to a minimum or eliminated from the interior surfaces of the carriers as much as possible.

To commence in such refrigerated cargo is often of a one way nature, requiring the use of the refrigerated carrier in one direction only, which results in deadheading (shipping back empty) of the carriers on the return trip, with a consequential loss of valuable cargo space.

Accordingly, the present invention concerns a cargo restraining clamp developed to alleviate the problem of deadheading of special purpose refrigerated carriers by enabling them to be utilizing for the general purpose shipment of cargo.

2. Discussion of the Prior Art

The prior art is replete with designs of special purpose clamping arrangements. For example, Hendricks et al. U.S. Pat. No. 4,311,420 discloses a snubbing block for use in a refrigerated carrier that has an upwardly extending T-handle for expanding an internal wedge clamp against adjacent side walls of a channel floor used in a refrigerated container. Although this reference discloses the use of a removable floor clamp in a refrigerated environment, the physical structure thereof is totally different from that of the subject invention.

Elsner U.S. Pat. No. 2,891,490 discloses a cargo rail tie down for use on a fixed special purpose rail to be mounted in a cargo compartment of an airplane. The clamp has an eyelet tie-down rail, a downwardly extending channel member which grips the tie-down rail, and a horizontal plate that engages cooperating slots formed along the rail. This tie-down, however, does not clamp to the rail, but uses the specially formed slots in the rail to secure it against longitudinal motion.

Laron U.S. Pat. No. 2,867,874 discloses an eye bolt with a clamp and threaded member for clamping the eye bolt to a wooden member.

Howell U.S. Pat. Nos. 4,230,432 and Brunelle 4,449,875 disclose track fasteners or clamps for securing the fastener to a longitudinal rail wherein the fastener has a flange member that is drawn upwardly against the horizontal flanges of the track. These members are clamped against the track by means of a threadable member.

Hain U.S. Pat. No. 2,529,153 discloses a conventional clamp for clamping to a T-member.

However, none of the references discussed hereinabove provides a cargo restraining floor clamp similar to that of the present invention for use with a refrigerated carrier having a T type flooring structure.

SUMMARY OF THE INVENTION

Accordingly, it is a primary object of the present invention to provide a cargo restraining clamp for use in refrigerated carriers to enable such carriers to be used for the transport of general types of cargo, thus minimizing the problem of deadheading of these containers on a return trip.

More particularly, the cargo restraining clamp of the present invention was developed for use on refrigerated carriers having a T-type flooring structure.

In accordance with the teachings herein, the present invention provides a clamping arrangement for clamping to a floor constructed from a plurality of parallel arranged T-shaped floor members. In this clamping arrangement, a channel shaped top floor plate is positioned across the top of two adjacent T shaped floor members, and an under floor hold down plate is positioned beneath the T tops between the two adjacent T shaped floor members. At least one bolt, and preferably at least two, extend through the top floor plate, between the two adjacent T shaped floor members, and through the under floor hold down plate, and serve to clamp the plates to opposite sides of the T tops of the T shaped floor members.

In a preferred embodiment, the channel shaped top floor plate is elongated, with its length extending parallel to the T shaped floor members, and has a cross section in the shape of an inverted U, with the base of the inverted U extending completely across the tops of the two adjacent T shaped floor members, and the legs of the U extending downwardly outside of the T tops. The under floor hold down plate is also elongated, having a length substantially the same as the top floor plate, and the under floor plate has a width slightly less than the distance between the central vertical support members of the adjacent T shaped floor members. The upper surface of the under floor hold down plate can also be knurled to assist in binding it to the bottom surfaces of the T tops. The arrangement is clamped together by two eye bolts, each positioned near one end of the top floor and under floor plates, and the under floor plate includes a threaded aperture near each end thereof to threadedly engage each eye bolt.

In one preferred embodiment a wooden beam is also positioned on top of the top floor plate, and an elongated strap member, having a length substantially equal to the top floor plate, is positioned on top of the wooden beam, with the two eye bolts extending through the strap member, outside the wooden beam, through the top floor plate, between the adjacent T shaped floor members, and into the threaded apertures of the under floor plate, to clamp all of those members together. Furthermore, the wooden beam has a length substantially greater than the plate members, and extends transversely to the T shaped floor members, with the clamping arrangement being postitioned near one end of the wooden beam, and a second similar clamping arrangement positioned at the opposite, second end of the wooden beam.

Moreover in a preferred embodiment, the strap member, the top floor plate, and the under floor plate can all be provided with at least one nailing aperture therein, all of which are aligned with respect to each other, such that a nail can be driven through the wooden beam in the aligned apertures in the strap member, and in the top floor and under floor plates. Moreover, the strap member can also be channel shaped, having a cross section in the shape of a U, with the legs of the U extending upwardly in a direction opposite to the direction of extension of the legs of the channel shaped top floor plate.

In a preferred embodiment, each threaded aperture in the under floor plate includes a threaded nut secured to the bottom thereof, and the eye bolt extends through and projects beyond the nut, with the projecting end being peened to prevent the nut from being removed, and thus keep all of the parts assembled together, when the clamp is removed from the T floor.

BRIEF DESRIPTION OF THE DRAWINGS

The foregoing objects and advantages fo the present invention for a refrigerated carrier floor clamp may be more readily understood by one skilled in the art with reference being had to the following detailed description of a preferred embodiment thereof, taken in conjunction with the accompanying drawings wherein like elements are designated by identical reference numerals throughout the several views, and in which.

Figure 1:
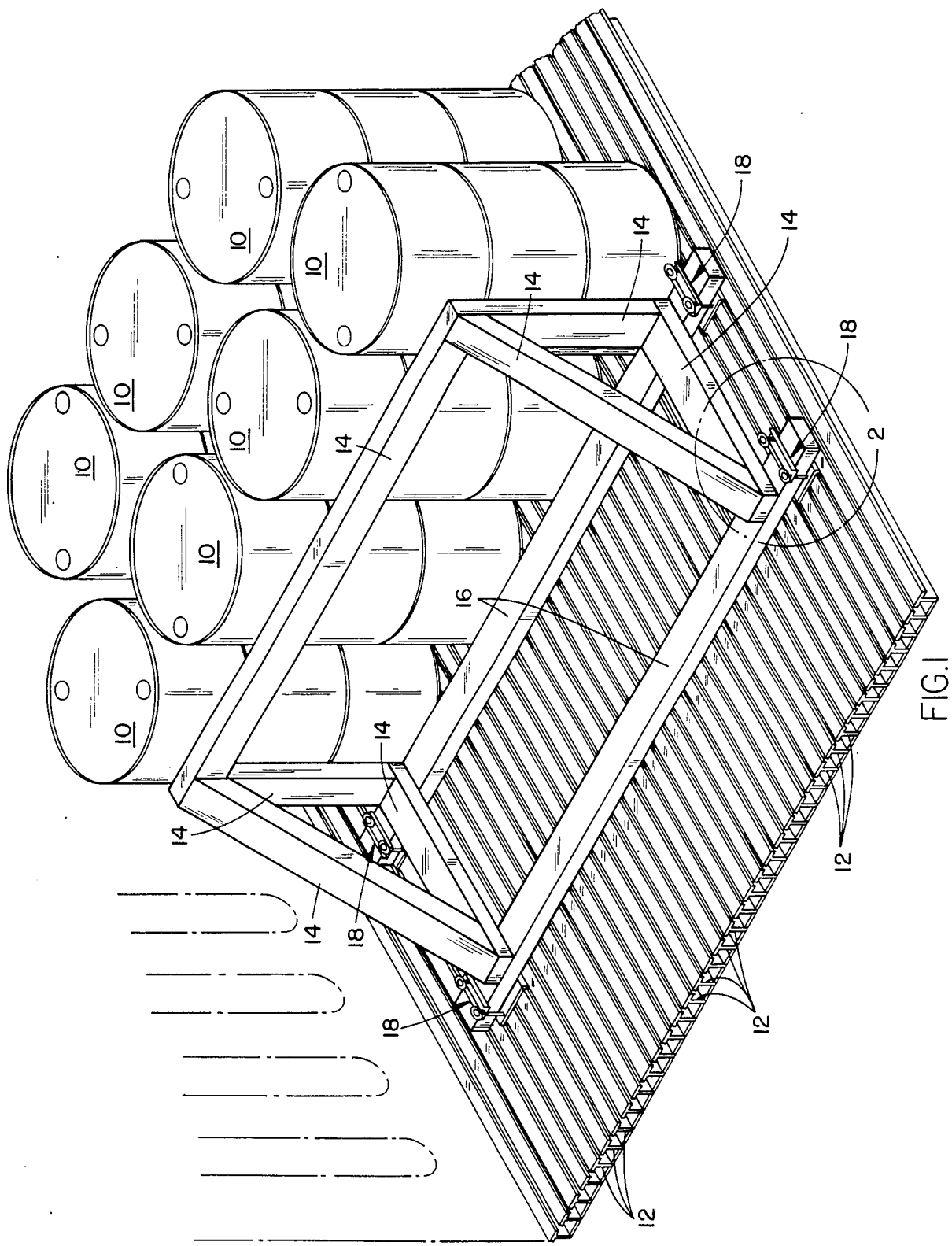
FIG. 1 is a perspective view of cargo in a refrigerated carrier being restrained by four separate floor clamps constructed pursuant to the teachings of the present invention.
Figure 2:
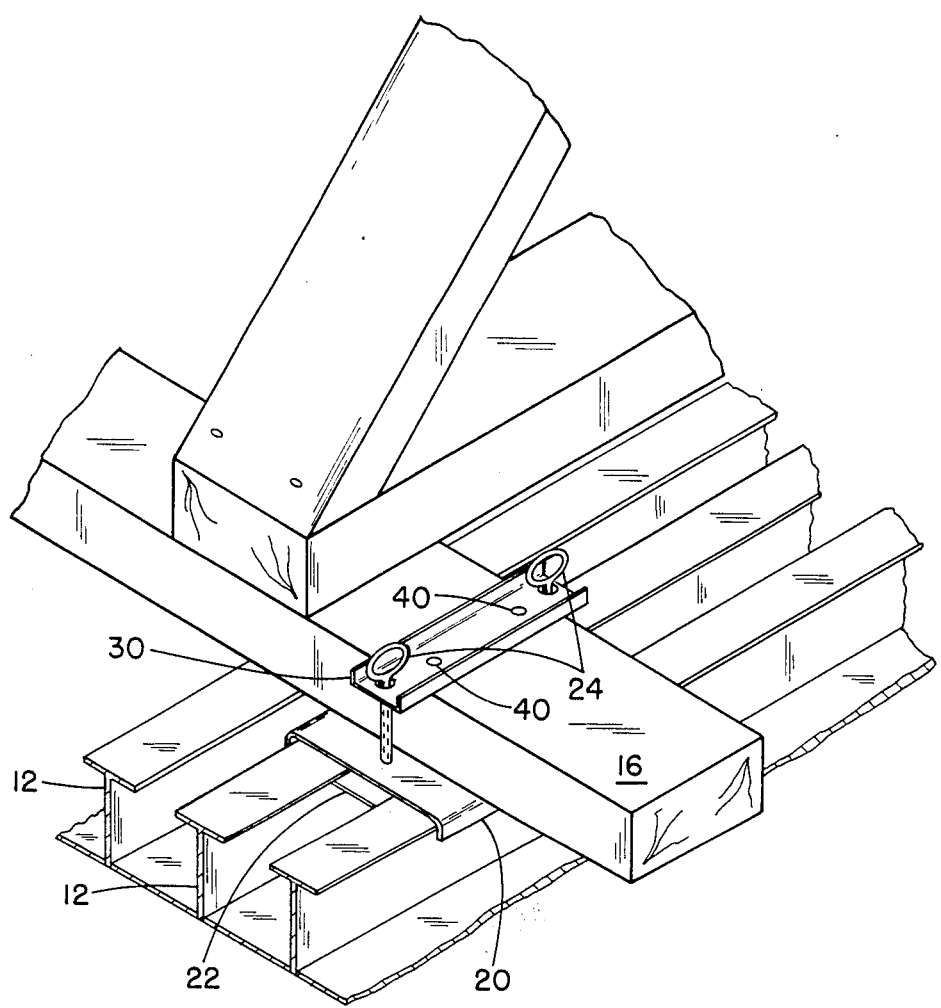
FIG. 2 is an enlarged view of an exemplary embodiment of a floor clamp in the detail circle 2 of FIG. 1.
Figure 3:
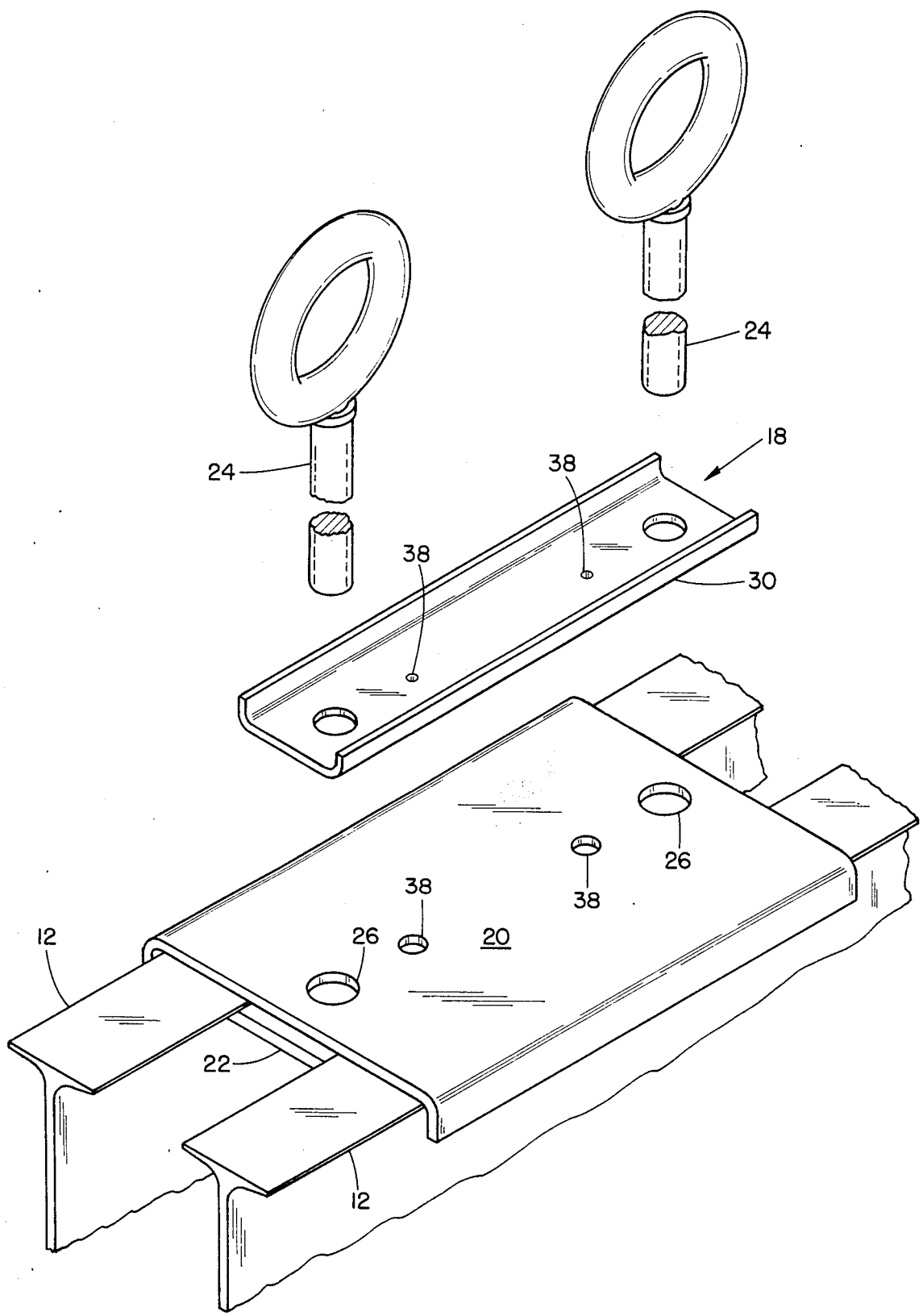
FIG. 3 illustrates an exploded view of the exemplary embodiment of the inventive floor clamp.
Figure 4:
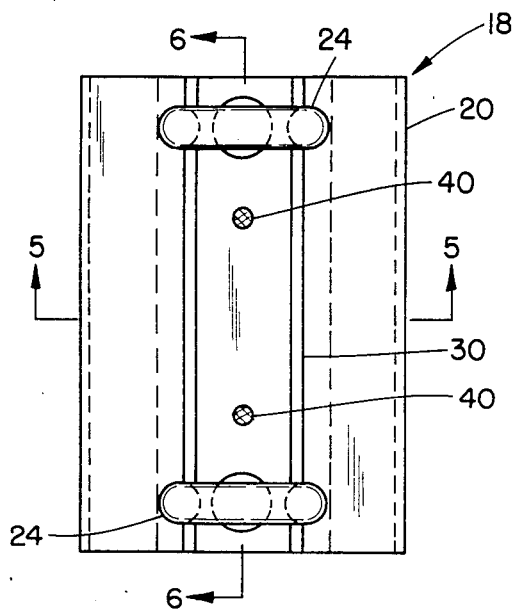
Figure 6:
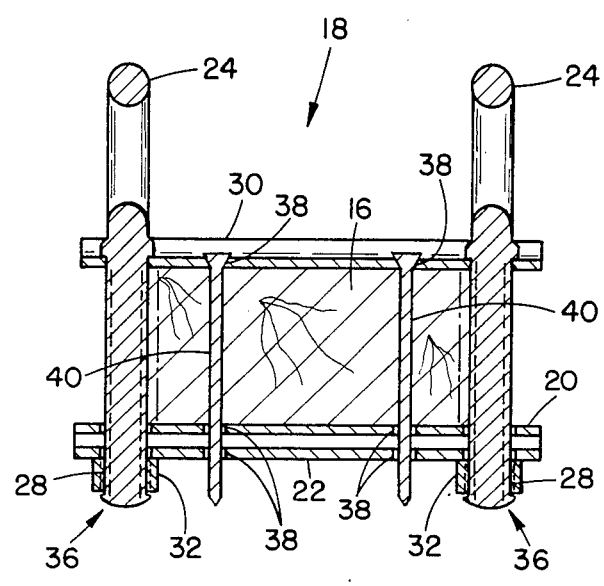
Figure 5:
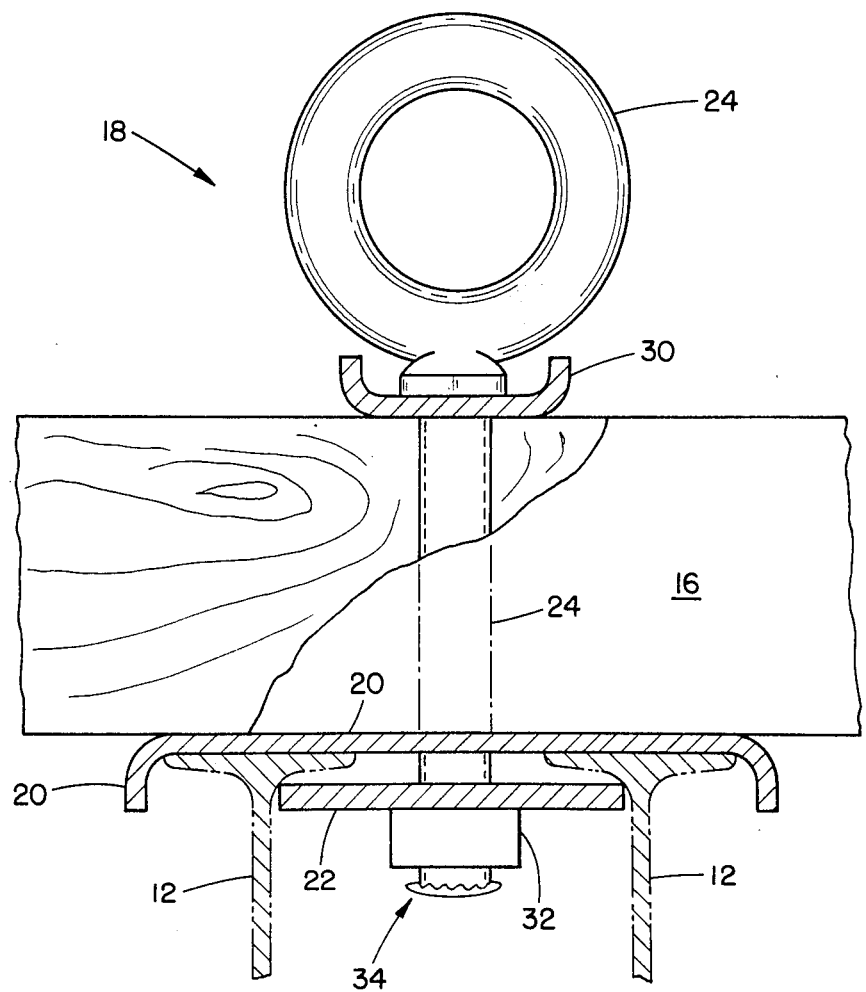

FIG. 4 illustrates a top plan view of the exemplary floor clamp of FIG. 1 through 3; and FIGS. 5 and 6 are sectional views taken along respective sectional lines 5—5 and 6—6 in FIG. 4.

DETAILED DESCRIPTION OF THE DRAWINGS

FIG. 1 is a schematic exemplary illustration of general purpose cargo in the form of drums 10 being transported in a refrigerated carrier having a T type flooring structure formed by a plurality of T shaped floor members 12 which are provided to circulate cooled air beneath a refrigerated cargo load.

The drums 10 are secured on one side by a general purpose cargo barrier 14 formed on top of two beams 16 which extend transversely across the T shaped floor members 12, and are securely fastened thereto by floor clamping arrangements 18, one of which is located at each end of the transverse beams 16.

FIG. 2 is an enlarged view of an exemplary embodiment of one floor clamping arrangement 18 in the detail circle 2 of FIG. 1, and FIG. 3 is an exploded view of the components of the clamping arrangement. Referring to FIG. 3, a channel shaped top floor plate 20 is positioned across the top of two adjacent T shaped floor members 12, and an under floor hold down plate 22 is positioned beneath the T tops between the two adjacent T shaped floor members. Two eye bolts 24 extend through apertures 26 in the top floor plate, between the two adjacent T shaped floor members, and through apertures 28 in the under floor hold down plate, and serve to clamp the plates to opposite sides of the T tops of the T shaped floor members.

In the illustrated and preferred embodiment, the channel shaped top floor plate is elongated, having a length slightly longer than the width of the beam 16, with its length extending parallel to the T shaped floor members. The top floor plate has a preferred cross section in the shape of an inverted U, with the base of the inverted U extending completely across the tops of the two adjacent T shaped floor members, and the legs of the U extending downwardly outside of the T tops. This results in a very secure placement of the top floor plate over the T shaped floor members.

The under floor hold down plate 22 is also elongated, having a length substantially the same as the top floor plate 20, and the under floor plate has a width slightly less than the distance between the central vertical support members of the adjacent T shaped floor members. The upper surfaces of the under floor hold down plate can also be knurled to assist in binding it to the bottom surfaces of the T tops.

In its most elementary form, the clamping arrangement of the present invention can comprise only the top floor plate 20, the under floor hold down plate 22 and at least one, but preferably two, bolts 24 clamping the plates securely to the upper and lower surfaces of the T tops of the floor members. In this embodiment, the eye of the clamping bolt or bolts can be utilized to lash down the cargo, for instance machinery or automobiles.

However, in the illustrated embodiment, the wooden beam 16 is also positioned on top of the top floor plate, and an elongated strap member 30, having a length substantially equal to that of the two plates, is positioned on top of and across the wooden beam, with the two eye bolts 24 extending through the strap member, outside the wooden beam, through the top floor plate, between the adjacent T shaped floor members, and into the threaded apertures 28 in the under floor hold down plate 22. In this embodiment, nuts 32 are secured and permanently affixed to the underside of the under floor plate 22 to form the threaded apertures, although in some embodiments the threaded apertures could also be formed directly in the plate 22. In the illustrated embodiment the eye bolt extends through and projects beyond the nut 32, and the projecting end can be peened as at 34 or welded as at 36 to prevent the clamp from disassembling into many separate pieces when it is removed from the T floor.

Moreover in the illustrated embodiment, the strap member 30, the top floor plate 20, and the under floor plate 22 can all be provided with two spaced nailing apertures 38 therein, are aligned with respect to each other, such that nails 40 can be driven through the wooden beam in the aligned apertures in the strap member, and in the top floor and under floor plates. Moreover, the strap member 30 can also be channel shaped, having a cross section in the shape of a U, with the legs of the U extending upwardly in a direction opposite to the direction of extension of the legs of the channel shaped top floor plate, as illustrated in FIG. 5. In an alternative embodiment, the strap member could be a plain rectangular plate.

The present invention is capable of many different embodiments and alternative constructions. As mentioned hereinabove, in its most elementary form, the clamping arrangement can comprise only the top floor plate 20, the under floor hold down plate 22 and at least one, but preferably two, bolts 24 clamping the plates securely to the upper and lower surfaces of the T tops of the floor members. The widths of the top floor plate 20 and the under floor hold down plate 22 are dictated primarily by the widths of the T shaped floor members, and in one modification, the top floor plate could extend across more than two T shaped floor members. The lengths of the top floor and under floor plates can vary considerably, and in the illustrated embodiment are slightly longer than the width of the beam 16 to position the eye bolts 24 alongside the beam 16. However, the eye bolts could also extend through bores in the beam rather than alongside thereof. Moreover, in some embodiments wherein a lashing function is not required, the eye bolts can be replaced by conventional bolts.

As is evident from the illustrated embodiment, the clamping arrangements 18 can be easily removed to allow the refrigerated carrier to be utilized in a normal refrigerated mode. Moreover, it should be mentioned that the clamping arrangements 18 might also be utilized to secure refrigerated cargo in place, and accordingly need not only be utilized to eliminate deadheading of the refrigerated carriers.

While several embodiments are variations of the present invention for a refrigerated carrier floor clamp are described in detail herein, it should be apparent that the disclosure amd teachings of the present invention will suggest many alternative designs to those skilled in the art.

What is claimed is:

1. A clamping arrangement for clamping to a floor constructed from a plurality of parallel arranged T-shaped floor members, comprising:
    a. a cargo carrier having a floor constructed from a plurality of parallel arranged T-shaped floor members which are spaced apart at regular intervals along the floor to form a cargo bearing floor formed by the tops of the regularly spaced apart T-shaped floor members, with the top of each T-shaped floor member being supported by a central vertical support member, with the spaces between the regularly spaced apart floor members providing for ventilation to allow air to circulate beneath the cargo;
    b. a channel shaped top floor plate positioned across the top of two adjacent T-shaped floor members, said channel shaped top floor plate comprising an elongated member with its length extending parallel to the T-shaped floor members, and having a cross section in the shape of an inverted U with the base of the inverted U extending completely across the tops of the two adjacent T-shaped floor members, and the legs of the U extending downwardly outside of the T tops of the two adjacent T-shaped floor members;
    c. an under floor hold down plate positioned between the two adjacent T-shaped floor members and beneath the T-tops of the T-shaped floor members, said under floor hold down plate including at least one threaded aperture therein;
    d. an elongated strap member, having a length substantially equal to the top floor plate, adapted to be positioned on top of a beam placed on top of the top floor plate; and
    e. at least one bolt extending through said strap member, alongside the beam, through the channel shaped top floor plate, between the two adjacent T-shaped floor members, and through a said threaded aperture in the under floor hold down plate, and serving to clamp the top floor plate to the under floor hold down plate against the T tops of the T-shaped floor members positioned therebetween.

2. A clamping arrangement for clamping to a floor constructed from a plurality of parallel arranged T shaped floor members as claimed in claim 1, including a beam extending transversely to the T shaped floor members, said clamping arrangement being positioned near one end of said beam, and further including a second clamping arrangement, as claimed herein, positioned at the opposite, second end of said beam.

3. A clamping arrangement for clamping to a floor constructed from a plurality of parallel arranged T shaped floor members as claimed in claim 2, said strap member, top floor plate and under floor hold down plate all having at least one nailing aperture therein, which are aligned with respect to each other, and further including a nail extending through said beam in the aligned apertures in said strap member, said top floor plate and said under floor hold down plate.

4. A clamping arrangement for clamping to a floor constructed from a plurality of parallel arranged T-shaped floor members, comprising:
    a. a cargo carrier having a floor constructed from a plurality of parallel arranged T-shaped floor members which are spaced apart at regular intervals along the floor to form a cargo bearing floor formed by the tops of the regularly spaced apart T-shaped floor members, with the top of each T-shaped floor member being supported by a central vertical support member, with the spaces between the regularly spaced apart floor members providing for ventilation to allow air to circulate beneath the cargo;
    b. a channel shaped top floor plate positioned across the top of two adjacent T-shaped floor members, said channel shaped top floor plate comprising an elongated member with its length extending parallel to the T-shaped floor members, and having a cross section in the shape of an inverted U with the base of the inverted U extending completely across the tops of the two adjacent T-shaped floor members, and the legs of the U extending downwardly outside of the T tops of the two adjacent T-shaped floor members;
    c. an under floor hold down plate positioned between the two adjacent T-shaped floor members and beneath the T tops of the T-shaped floor members, said under floor hold down plate comprising an elongated plate having a length substantially equal to the length of said top floor plate and extending parallel to said top floor plate, said under floor hold down plate having a width slightly less than the distance between the central vertical support members of the adjacent T shaped floor members, and said under floor hold down plate including a threaded aperture near each end thereof;
    d. an elongated strap member, having a length substantially equal to the top floor plate, adapted to be positioned on top of a beam placed on top of the top floor plate; and
    e. at least two bolts, each positioned near an end of said strap member, said top floor plate, and said under floor hold down plate, and each bolt extending through said strap member, alongside the beam, through the channel shaped top floor plate, between the two adjacent T-shaped floor members, and through a said threaded aperture in the under floor hold down plate, and serving to clamp the top floor plate to the under floor hold down plate against the T tops of the T-shaped floor members positioned therebetween.

5. A clamping arrangement for clamping to a floor constructed form a plurality of parallel arranged T shaped floor members as claimed in claim 4, including a wooden beam extending transversely to the T shaped floor members, said clamping arrangement being positioned near on end of said wooden beam, and further including a second clamping arrangement, as claimed herein, positioned at the opposite, second end of said wooden beam.

6. A clamping arrangement for clamping to a floor constructed from a plurality of parallel arranged T shaped floor members as claimed in claim 5, said strap member, top floor plate and under floor hold down plate all having at least one nailing aperture therein, which are aligned with respect to each other, and further including a nail extending through said wooden beam in the aligned apertures in said strap member, said top floor plate and said under floor hold down plate.

7. A clamping arrangement for clamping to a floor constructed from a plurality of parallel arranged T shaped floor members as claimed in claim 6, said strap member comprising a channel shaped member having a cross section in the shape of a U, with the legs of the U extending upwardly in a direction opposite to the direction of extension of the legs of said channel shaped top floor plate.

8. A clamping arrangement for clamping to a floor constructed form a plurality of parallel arranged T shaped floor members as claimed in claim 7, each threaded aperture including a threaded nut secured to the bottom of said under floor hold down plate.

9. A clamping arrangement for clamping to a floor constructed from a plurality of parallel arranged T shaped floor members as claimed in claim 8, each eye bolt extending through and projecting beyond said nut and having the projecting end peened to prevent removal of the bolt.

10. A clamping arrangement for clamping to a floor constructed from a plurality of parallel arranged T shaped floor members as claimed in claim 8, each bolt extending through and projecting beyond said nut and having the projecting end welded to prevent removal of the bolt.

* * * * *